United States Patent
Shaffer et al.

(10) Patent No.: US 7,289,620 B2
(45) Date of Patent: Oct. 30, 2007

(54) METHOD AND APPARATUS FOR MANAGING INCOMING AND OUTGOING CALLS AT AN ENDPOINT PLACED ON HOLD

(75) Inventors: Shmuel Shaffer, Palo Alto, CA (US); Rohit Dewan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/356,064

(22) Filed: Feb. 15, 2006

(65) Prior Publication Data

US 2006/0171519 A1    Aug. 3, 2006

Related U.S. Application Data

(63) Continuation of application No. 09/990,688, filed on Nov. 9, 2001, now Pat. No. 7,006,618.

(51) Int. Cl.
*H04M 3/42* (2006.01)
(52) U.S. Cl. .................. 379/215.01; 379/202.01; 379/204.01; 370/260
(58) Field of Classification Search .......... 379/215.01, 379/202.01, 204.01; 370/260
See application file for complete search history.

(56) References Cited

U.S. PATENT DOCUMENTS

| | | | | |
|---|---|---|---|---|
| 6,118,861 | A | 9/2000 | Gutzmann et al. | 379/201 |
| 6,125,178 | A | 9/2000 | Walker et al. | 379/211.01 |
| 6,178,237 | B1 | 1/2001 | Horn | 379/202.01 |
| 6,453,022 | B1 | 9/2002 | Weinman, Jr. | 379/88.13 |
| 6,577,622 | B1 * | 6/2003 | Schuster et al. | 370/352 |
| 6,785,560 | B1 | 8/2004 | Chow et al. | 455/564 |

* cited by examiner

*Primary Examiner*—Quynh H. Nguyen
(74) *Attorney, Agent, or Firm*—Baker Botts L.L.P.

(57) ABSTRACT

A method and apparatus for managing incoming and outgoing calls at an endpoint placed on hold are disclosed. A first call that includes an outbound media stream is established on a network between a first endpoint and a second endpoint. The first endpoint detects that the first call was placed on hold by the second endpoint and a second call between the first endpoint and a third endpoint after detecting that the first call was placed on hold. The first endpoint communicates the outbound media stream in the second call and mixes a first incoming media stream from the first call with a second incoming media stream from the second call for presentation to a user of the first endpoint.

21 Claims, 2 Drawing Sheets

METHOD AND APPARATUS FOR MANAGING INCOMING AND OUTGOING CALLS AT AN ENDPOINT PLACED ON HOLD

CROSS-REFERENCE TO RELATED APPLICATION

This application is a continuation of U.S. application Ser. No. 09/990,688 filed Nov. 9, 2001 now U.S. Pat. No. 7,006,618 and entitled "Method and Apparatus for Managing Incoming and Outgoing Calls at an Endpoint Placed on Hold".

TECHNICAL FIELD OF THE INVENTION

This invention relates in general to telecommunication, and more particularly to a method and apparatus for managing incoming and outgoing calls at an endpoint when placed on hold.

BACKGROUND OF THE INVENTION

Today, most telephones include a function that allows a user to place a telephone call on hold and maintain the connection with a party at the other end of the call. The user, therefore, may receive another call or perform other tasks without disconnecting the call that was placed on hold. The remote party, however, typically does not know how long the call will remain on hold and must wait on the line until the user returns. This may be frustrating for the remote party since it is not uncommon for the user to put the call on hold for several minutes. The remote party may not want to risk placing or receiving another call on a second line if there is a possibility that the user will release the on-hold call.

SUMMARY OF THE INVENTION

In accordance with the present invention, the disadvantages and problems associated with managing incoming and outgoing calls at an endpoint placed on hold have been substantially reduced or eliminated. In a particular embodiment, a method for managing incoming and outgoing calls when an endpoint has been placed on hold is disclosed that communicates an outbound media stream in a second call after detecting that a first call was placed on hold and mixes inbound media streams associated with first and second calls.

In accordance with one embodiment of the present invention, a method for managing incoming and outgoing calls at an endpoint placed on hold includes establishing a first call that includes an outbound media stream on a network between a first endpoint and a second endpoint and detecting that the first call was placed on hold by the second endpoint. A second call between the first endpoint and a third endpoint is established after detecting that the first call was placed on hold. The first endpoint communicates the outbound media stream in a second call and mixes a first coming media stream from the first call with a second incoming media stream from the second call for presentation to a user of the first endpoint.

In accordance with another embodiment of the present invention, a method for managing incoming and outgoing calls when a telephone call has been placed on hold by a remote telephone includes establishing a first call on a network between a first telephone and a second telephone. The first call includes a first media stream communicated from the first telephone to the second telephone and a second media stream communicated from the second telephone to the first telephone. A second call is established between the first telephone and a third telephone after detecting that the first call has been placed on hold by the second telephone. The second call includes a third media stream communicated from the third telephone to the first telephone. The first telephone communicates the first media stream in a second call and mixes the second and third media streams to generate a mixed media stream for presentation to a user of the first telephone.

In accordance with a further embodiment of the present invention, a telephony device includes a network interface operable to couple to a network, a transmit circuit and a receive circuit coupled to the network interface, and a control unit coupled to the transmit and receive circuits. The control unit detects that a first call was placed on hold by a first remote endpoint. The first call includes an outbound media stream communicated to the first remote endpoint and a first incoming media stream communicated from the first remote endpoint. The control unit establishes a second call with a second remote endpoint after detecting that the first call was placed on hold. The second call includes a second incoming media stream communicated from the second remote endpoint. The control unit instructs the transmit circuit to communicate the outbound media stream to a second remote endpoint in a second call and instructs the receive circuit to mix the first and second incoming media streams for presentation to a user.

Important technical advantages of certain embodiments of the present invention include a telephony device that allows a user at an endpoint to simultaneously monitor a call that was placed on hold and participate in an active call. When a user detects that a remote party has placed a call on hold, the user may wish to place or receive another call without dropping the call that was placed on hold. A mixing function that generates a mixed media stream is activated when the user establishes a second call. The mixed media stream contains a percentage of each of the incoming media streams associated with the on hold and active calls and provides the user with the ability to determine when the remote party releases the call.

Another important technical advantage of certain embodiments of the present invention includes a telephony device that isolates a call that was placed on hold from an active call. When a user participates in a telephone call, the user's voice information is communicated to the party at the other end of the telephone call. If the user wishes to receive or place a second call when the first call has been placed on hold, the user may not want the outbound voice information to be communicated to both the active and on-hold calls. After establishing the second call, the user's outbound voice information is communicated in the active call. The remote party, therefore, does not hear the user's conversation in the second call unless the user transfers the outbound media stream back to the first call.

A further technical advantage of certain embodiments of the present invention includes a telephony device that provides selective mixing of incoming media streams associated with an active and an on-hold call. In most situations, an endpoint placing a call on hold does not need to monitor the on-hold call since that endpoint controls when the on-hold call will be released. The remote endpoint, however, may want to monitor the on-hold call since the remote endpoint does not know how long that the call will be on hold. The mixing function, therefore, may be activated by the remote endpoint when the call is placed on hold and may be deactivated when the remote endpoint releases the call from on hold.

All, some, or none of these technical advantages may be present in various embodiments of the present invention. Other technical advantages will be readily apparent to one skilled in the art from the following figures, descriptions, and claims.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
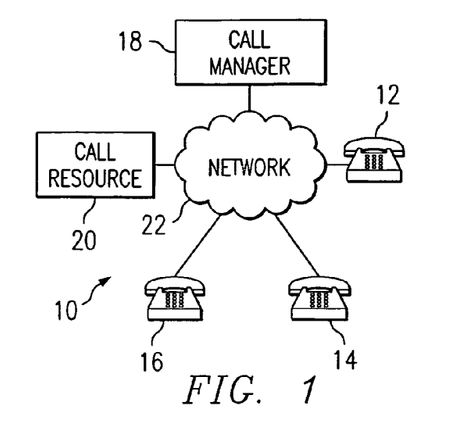
FIG. 1 illustrates a block diagram of a communications network including endpoints that manage incoming and outgoing calls when placed on hold in accordance with the teachings of the present invention.

FIG. 1 illustrates a block diagram of a communication system, indicated generally at 10, for managing incoming and outgoing calls at an endpoint that has been placed on hold. In the illustrated embodiment, system 10 includes endpoints 12, 14 and 16 (generally referred to as endpoints 12), call manger 18 and call resource 20 coupled to network 22. In one embodiment, endpoints 12 manage incoming and outgoing calls when endpoints 12 have been remotely placed on hold by communicating an outbound media stream in a second call after detecting that a first call has been placed on hold and mixing incoming media streams associated with the first and second calls. The user, therefore, may monitor the first call and participate in the second call.

Although a specific communication network is illustrated in FIG. 1, the term "network" should be interpreted as generically defining any network capable of transmitting telecommunication signals, data and/or messages. Network 22 represents any suitable collection and arrangement of communications equipment supporting the transport and delivery of packets, cells, or other portions of information (generally referred to as packets). For example, network 22 may be one or a collection of components associated with the public switched telephone network (PSTN), a local area network (LAN), a wide area network (WAN), a global computer network such as the Internet, or any other communications equipment suitable for providing wireless and/ or wireline communications. In operation, network 22 routes various packets of information associated with communication sessions along different physical paths.

In a particular embodiment, network 22 may be an Internet Protocol (IP) network. However, network 22 may be any type of network that allows transmission of audio and video telecommunication signals, as well as traditional data communications. Therefore, although subsequent description will primarily focus on IP communications, it should be understood that other appropriate methods of transmitting media over a network, such as a Frame Relay, Asynchronous Transfer Mode (ATM), or other packet-based network, are also included within the scope of the present invention.

IP networks and other packet-based networks typically transmit media by placing the data in packets and sending each packet individually to the selected destination. Unlike a circuit-switched network, such as the PSTN, a dedicated circuit is not required for the duration of a call over network 22. Instead, endpoints 12 may send packets across network 22 as network 22 becomes available for transmission. This feature makes bandwidth available for additional communications when endpoints 12 are not communicating media.

The technology that allows voice media in particular to be transmitted over a packet-based network may be referred to as Voice over Packet (VoP). Endpoints 12 may have the capability to encapsulate a user's voice or other content into data packets so that the content may be transmitted over network 22. Endpoints 12 may, for example, include cordless or cellular telephones, personal digital assistants (PDAs), or other wireless devices. Also, endpoints 12 may include telephony software running on a computing device, traditional plain old telephone (POTS) devices, analog phones, digital phones, IP telephony devices, or other computing and/or communication devices that communicate media using analog and/or digital signals. The telephony software or logic may be embodied in any type of medium including, but not limited to, hard drives, diskettes, CD-ROMs, DVD-ROMs, optical or magnetic media, field programmable arrays (FPGAs), embedded processors, or any other suitable media.

System 10 includes call manager 18 that manages the overall establishment of calls occurring over network 22. Call manager 18 is an application that controls call processing, routing, telephone features and options (such as call hold, call transfer, call waiting, and user ID), device configuration, and other functions and parameters within network 22. Call manager 18 may control one or more of endpoints 12 coupled to network 22. Call manager 18 may also control endpoints located on other networks communicating with network 22. Call manager 18 may be implemented as hardware and/or software executing on one or more computers coupled to network 22. In other embodiments, the functionality of call manager 18 may be distributed on network 22 or co-reside on endpoints 12.

In system 10, signaling to and from endpoints 12 during a call is first passed through call manager 18. Signaling between endpoints 12 and call manager 18 may be performed using any appropriate standards-based or proprietary signaling method, including, but not limited to, a direct signaling model, such as H.323, session initiation protocol (SIP), media gateway control protocol (MGCP) or any other suitable technique. Call manager 18 may provide signaling for the call session and may instruct call resource 20 to mix media streams communicated to endpoints 12.

Call resource 20 couples to network 22 and may be separate from or a part of call manager 18 and/or endpoints 12. Call resource 20 includes multiple media processors that exchange and mix media streams associated with endpoints 12 participating in a call over network 22. In one embodiment, call resource 20 receives media streams generated by endpoints 12, encodes, decodes, and/or transcodes the media streams into a proper format using at least one of the media processors, and generates a number of mixed media streams for communication back to endpoints 12. The media streams received by call resource 20 and the mixed media streams communicated by call resource 20 may be in the form of media encoded in packets for communication using network 22. The media processors may be microprocessors, microcontrollers, digital signal processors (DSPs), or any other digital circuitry configured to perform encoding, transcoding, compressing, decoding, mixing and any other suitable signal processing functions.

In operation, endpoint 12 may initiate a call to endpoint 14. During the call, a user at endpoint 12 may detect that endpoint 14 has placed the call on hold. If the user at endpoint 12 wants to place or receive a second call without disconnecting from the on-hold call, the user at endpoint 12 selects another telephone line and activates a mixing function that mixes a first incoming media stream communicated from endpoint 14 with a second incoming media stream associated with the second call (e.g., a call received from or placed to endpoint 16) to generate a mixed media stream. The mixed media stream provides the user at endpoint 12 with voice information from each of endpoints 14 and 16, which allows the user at endpoint 12 to monitor the call that has been placed on hold while participating in the second call.

In one embodiment, a control unit in endpoint 12 performs the mixing function. In another embodiment, call manager 18 directs the first and second incoming media streams to call resource 20 for mixing and call resource 20 communicates a mixed media stream to endpoint 12. The processing resources in endpoints 12 and call resource 20 generate the mixed media stream by mixing the first media stream at a reduced power level (e.g., less than fifty percent) and the second media stream at the full power level (e.g., approximately one-hundred percent). The percentage of the first and second incoming media streams in the mixed media stream may be based on the status of the call and may correspond to the volume of the voice information heard by the user at endpoint 12 from each of the incoming media streams. For example, an additional call may be established between endpoints 12 and 16 while the call between endpoints 12 and 14 is on hold. In this example, the percentage, and thus the volume of the voice information presented to the user at endpoint 12, of the first incoming media stream contained in the me the call between endpoints 12 and 14 has been placed on hold.

When the additional call is established between endpoints 12 and 16, an outbound media stream generated by endpoint 12 may be communicated in the additional call with endpoint 16. In one embodiment, a transfer of the outbound media stream to the additional call may occur when the user at endpoint 12 presses a button to start mixing the incoming media streams. In another embodiment, call manager 18 may instruct a transmit unit in endpoint 12 to communicate the outbound media stream to endpoint 16 by specifying an IP address associated with endpoint 16. The user at endpoint 16, therefore, may hear the user at endpoint 12 while the user at endpoint 14 is unaware of the call between endpoints 12 and 16.

If the user at endpoint 14 releases the call from hold, the user at endpoint 12 may detect that the call has been removed from on hold, alert the user at endpoint 16 that endpoint 16 is being placed on hold, and transfer the outbound media stream from the additional call back to the original call. In one embodiment, when the user at endpoint 12 returns to the on-hold call after it is released by endpoint 14, mixing of the incoming media streams may be discontinued since the user at endpoint 12 placed the call with endpoint 16 on hold. In another embodiment, the percentage of the first and second incoming media streams that are contained in the mixed media stream may be altered when the on-hold call is released by endpoint 14. In this example, the mixing function toggles the percentage of the first and second incoming media streams such that the percentage of the first incoming media stream is greater than the percentage of the second incoming media stream.

Figure 2:
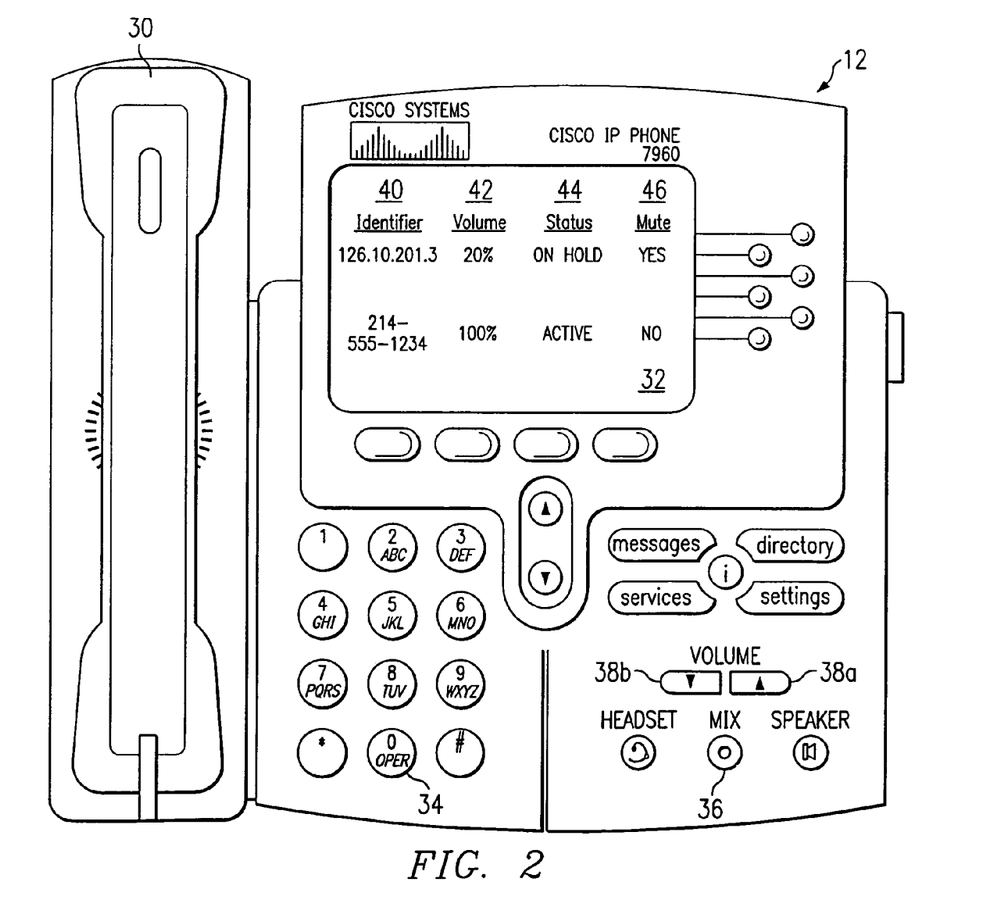
FIG. 2 illustrates a top view of an endpoint that manages incoming and outgoing calls when placed on hold.

FIG. 2 illustrates a top view of endpoints 12 that manage incoming and outgoing calls when a call being conducted by endpoints 12 is remotely placed on hold. In the illustrated embodiment, endpoints 12 include handset 30, display 32, keypad 34, mix button 36 and adjustment buttons 38a and 38b. Endpoints 12 may be a traditional POTS device, an analog phone, a digital phone, an IP telephony device, telephony software being executed by a computing device or any other suitable computing and/or communication device that communicates media using analog and/or digital signals. Handset 30 may include a speaker that allows a user to hear incoming voice information from a remote endpoint and a microphone that transmits voice information to a user at the remote endpoint. Keypad 34 may be used to generate out-of-band signals or in-band dual tone multifrequency (DTMF) signals for dialing a telephone number associated with a remote endpoint, responding to prompts for information, such as account numbers, or any other suitable function that may use DTMF signals. Mix button 36 may be a hardware button located on endpoint 12 or a software button displayed on display 32.

Display 32 may provide the user of endpoint 12 with information associated with calls conducted over network 22. As illustrated in FIG. 2, the information may include identifier 40 that provides information about the remote device participating in the call, such as an address and/or telephone number associated with the remote endpoint, volume 42 that provides a percentage of the incoming media stream in a mixed media stream presented to the user through the speaker in handset 30, status 44 that indicates if the call is active, on hold, or completed, mute 46 that indicates if the outbound media stream is present in the call and any other suitable information associated with a call being placed or received by endpoint 12. Display 32 may also provide the user of endpoint 12 with information that is accessible from a database or directory (not expressly shown) coupled to network 22, such as identifiers for endpoints 12 that are coupled to network 22, or any other suitable information that is associated with communication occurring over network 22.

In operation, a user at endpoint 12 may pick up handset 30 to receive a call from a remote endpoint (e.g., endpoint 14). Display 32 provides the user with identifier 40 and any other suitable information associated with endpoint 14. In one embodiment, identifier 40 includes an IP address assigned to endpoint 14. In another embodiment, identifier 40 includes a telephone number assigned to endpoint and/or a name associated with the user of endpoint 12. Display 32 may also provide the user with volume 42, status 44 and/or mute 46 information associated with the incoming call.

If the user at endpoint 14 places the call on hold, the user at endpoint 12 may be notified verbally or over display 32. For example, endpoint 14 may generate a signal indicating that the call was placed on hold. This signal may be communicated to endpoint 12 in a packet associated with the call. Endpoint 12 decodes the information in the packet and indicates to the user through status 44 on display 32 that the call has been placed on hold. In an alternative embodiment, call manager 18 provides the signal that indicates to the user at endpoint 12 that the call was remotely placed on hold. In a further embodiment, endpoint 12 may detect that endpoint 14 has placed the call on hold and begin mixing any incoming media streams.

If the user at endpoint 12 would like to place another call without disconnecting the on-hold call, the user may select a second line and use keypad 34 to dial a telephone number. In addition to the information provided for the on-hold call on display 32, a second set of parameters are provided for the second call. For example, identifier 40 may initially display the telephone number input by the user and then display the IP address associated with the remote endpoint (e.g., endpoint 16) when the connection is established. Status 44 may also indicate that the first call with endpoint 14 is "ON HOLD" and the second call with endpoint 16 is "ACTIVE."

When endpoint 12 establishes a connection with endpoint 16, the user presses mix button 36 to mix the incoming media streams received by endpoint 12 that are associated with the on-hold call and the active call. For example, endpoint 12 receives two incoming media streams when the user begins communicating with a user at endpoint 16. The first media stream may be communicated by endpoint 14 and the second media stream may be communicated by endpoint 16. The two incoming media streams may be combined to generate a mixed media stream that is communicated to the speaker in handset 30 so that the user can hear any voice information being communicated by endpoints 14 and 16. In an alternative embodiment, endpoint 12 may detect that the remote endpoint has placed the call on hold. Endpoint 12 automatically begins the mixing function if a second call is either received or placed by the user at endpoint 12.

The mixed media stream may contain a reduced percentage of the power from the incoming media stream associated with the call that was placed on hold such that the volume of the voice information in the on-hold call is at a reduced level compared to the volume of the voice information in the active call. For example, since the user at endpoint 12 may only want to monitor the call that was remotely placed on hold to determine if the user at endpoint 14 has released the call, the mixed media stream may contain a small percentage of the first incoming media stream. In one embodiment, the power associated with the first incoming media stream may be between approximately ten and forty percent of the mixed media stream and the power associated with the second incoming media stream may be approximately one-hundred percent. In alternative embodiments, the percentages of the first incoming media streams may be any other suitable value that allows the user to monitor the call that was remotely placed on hold while participating in the active call. In each call, the volume associated with each media stream that can be heard by the user at endpoint 12 through speaker 30 is provided by volume 42 on display 32.

The user at endpoint 12 may adjust the percentage of each of the incoming media stream associated with the on-hold call by using adjustment buttons 38a and 38b. If the user presses adjustment button 38a, the percentage of the first incoming media stream communicated from endpoint 14 may increase. If the user presses adjustment button 38b, the percentage of the first incoming media stream may decrease. Any adjustments made by the user will be reflected in volume 42 on display 32 that is associated with the active and on-hold calls. For example, if the user chooses to set the volume of the on-hold call at fifteen percent of the maximum volume level, volume 42 displays "15%" for the on-hold call and "100%" for the active call.

Mix button 36 may also operate to communicate the outbound media stream generated by the microphone in handset 30 in the active call. In one embodiment, pressing mix button 36 transfers the outbound media stream from the on-hold call to the active call. In this example, the outbound media stream in the on-hold call is removed from the call session occurring between endpoints 12 and 14 so that the user at endpoint 14 cannot hear the conversation occurring between the users at endpoints 12 and 16. When mix button is pressed by the user at endpoint 12, a transmit unit communicates the outbound media stream containing the user's voice information on the second line. Mix button 36 may also instruct a control unit to indicate to the user that the outbound media stream is muted in the on-hold call. If the outbound media stream is muted, mute 46 displays a "YES" and if the outbound media stream is not muted, mute 46 displays a "NO."

When the user at endpoint 14 releases the call from on hold, the user at endpoint 12 may detect that the call has been released by faintly hearing the user's voice over the speaker in handset 30. The user may also receive notification on display 32 through status 44 that the first call has been released from on hold. In one embodiment, the media packets communicated from the remote endpoint contain a signal that indicates that endpoint 14 removed the call from on hold. Endpoint 12 receives the media packet as a part of the on-hold call, decodes the media packet and indicates that the call is "ACTIVE" through status 44 on display 32. In another embodiment, call manager 18 may provide the signal to endpoint 12 indicating that the on-hold call has been released by endpoint 14.

The user may return to the first call by pressing mix button 36. As described above, mix button 36 communicates the outbound media stream to the active call. In one embodiment, pressing mix button 36 places the previously active call with endpoint 16 on hold and discontinues mixing the incoming media streams. Status 44, therefore, indicates that the call with endpoint 16 is "ON HOLD." In an alternative embodiment, pressing mix button 36 automatically modifies the percentages of the first and second incoming media streams in the mixed media stream. For example, since the user placed the call with endpoint 16 on hold, the user may only want to monitor the second call rather than be an active participant. Therefore, the mixed media stream may be modified to contain a small percentage of the second incoming media stream and a large percentage of the first incoming media stream when the user presses mix button 36. The altered volumes are then displayed in volume 42 associated with each call on display 32.

Figure 3:
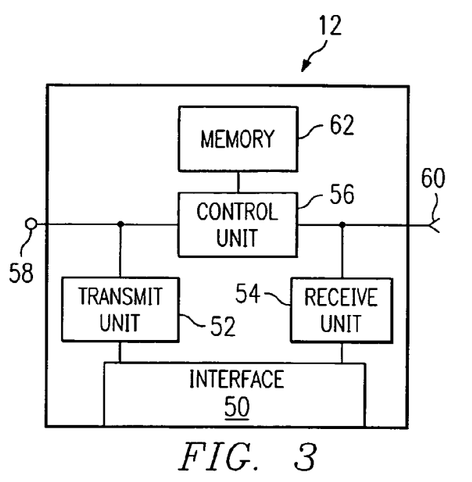
FIG. 3 illustrates a logical model of the endpoint that manages incoming and outgoing calls when placed on hold.

FIG. 3 illustrates a logical model of endpoint 12 that manages incoming and outgoing calls when a call is remotely placed on hold. In the illustrated embodiment, endpoint 12 includes network interface 50, transmit unit 52, receive unit 54, control unit 56, microphone 58 and speaker 60 and memory 62. Network interface 50 may communicate with network 22, and may receive media streams from remote endpoints and call resource 20 and signaling information from call manager 18. Network interface 50 may be a physical port, virtual port, or other suitable direct or indirect connection.

Control unit 56 may be one or a combination of microprocessors, microcontrollers, digital signal processors (DSPs), or any other digital circuitry configured to control media packets communicated from and/or to transmit unit 52 and receive unit 54. Transmit unit 52 and receive unit 54 may be separate or combined units that respectively transmit and receive media packets via network interface 50. Transmit unit 52, receive unit 54 and control unit 56 may further be separate or integral hardware and/or software. Memory 56 may be any suitable form of a volatile or non-volatile memory that is integral or separate from devices 12.

When a first call is established between endpoints 12 and 14, the user at endpoint 12 may speak into microphone 58 to generate voice information. The voice information is encoded and placed in packets by control unit 56. Transmit unit 52 then communicates the encoded media packets to endpoint 14 in an outbound media stream. Receive unit 54 receives media packets in a first incoming media stream from endpoint 14 and communicates media packets to control unit 56. Control unit 56 decodes the media packets and communicates the voice information from the decoded packets to speaker 60 for presentation to the user at endpoint 12.

If endpoint 14 places the first call on hold, the user detects that the first call was placed on hold by receiving verbal notification from the user at endpoint 14 or visual notification through status 44 on display 32 from endpoint 14 and/or call manager 18. If the user wishes to place or receive a second call, the user may indicate a desire to receive or place the second call by pressing a flash button (not expressly shown) on endpoint 12 to switch to a second line, pressing a selection button to select a second line, or pressing mix button 36 to initiate the mixing function.

After receiving an indication that the user wishes to initiate a second call, control unit 56 receives a signal generated in response to the user pressing mix button 36 or by call manager 18 to start mixing the first and second incoming media streams respectively associated with the first and second calls. Control unit 56 starts to mix the first and second incoming media streams and generate a mixed media stream for communication to speaker 60 in response to receiving the mixing signal. The mixed media stream contains a reduced percentage of the power associated with the incoming media stream from the on-hold call. The percentage of the media stream in the on-hold call corresponds to the volume of the voice information presented to the user through speaker 60. In one embodiment, the percentage of the first media stream associated with the on-hold call, and thus the volume, may be less than the percentage of the second media stream associated with the active call.

In an alternative embodiment, control unit 56 may not have the capability to mix the incoming media streams. In this case, control unit 56 instructs call manager 18 to communicate the first and second incoming media streams to call resource 20 for mixing. Call resource 20 generates a mixed media stream and communicates the mixed media stream to receive unit 54 via network interface 50.

Control unit 56 may also generate a signal that requests endpoint 14 not to play music or pre-recorded messages while the first call is on hold and instruct transmit unit 52 to communicate the signal to endpoint 14. If a second call is established at endpoint 12, control unit 56 starts the mixing function when control unit 56 receives an indication that endpoint 14 has released the call from on hold and has started communicating voice information in an incoming media stream. In an alternative embodiment, call manager 18 may detect that the first call was placed on hold, and simultaneously establish the second call and transmit a signal instructing endpoint 14 not to generate media packets while the first call is on hold.

Before the user at endpoint 12 can communicate with a user at endpoint 16, control unit 56 instructs transmit unit 52 to communicate the outbound media stream to endpoint 16 in the second call. Transmit unit 52 may transfer, duplicate, copy or reproduce the outbound media stream initially communicated to endpoint 12 in the first call for communication in the second call. In another embodiment, call manager 18 may establish the second call and instruct transmit unit 52 to communicate the outbound media stream to endpoint 16 in the second call by providing an IP address associated with endpoint 16 to transmit unit 52.

Once the second call is established, control unit 56 continues to mix the incoming media streams from endpoints 14 and 16 until endpoint 14 releases the first call from on hold. Control unit 56 detects that the first call was released through a signal contained in the media packets associated with the first incoming media stream or through signaling provided by call manager 18. In another embodiment, the user at endpoint 12 may receive verbal notification from the user at endpoint 14 that the first call has been released via speaker 60. After receiving notification that the first call has been released, the user then places the second call on hold and control unit 56 instructs transmit unit 52 to communicate the outbound media stream in the first call.

When the outbound media stream is transferred back to the first call, control unit 56 continues to mix the incoming media streams by toggling the percentage of the power associated with first and second incoming media streams in the mixed media stream. For example, after the transfer, the percentage of the second incoming media stream may be reduced and the percentage of the first incoming media stream may be increased. The user at endpoint 12, therefore, may be able to hear the user at endpoint 16 through speaker 60 and determine if the user at endpoint 16 wants to disconnect the second call. If the user at endpoint 12 decides to return to the second call before completing the first call, receive unit 54 may toggle the percentage of the first and second incoming media streams such that the percentage of the power associated with first incoming media stream is reduced and the percentage of the power associated with the second incoming media stream is increased. In an alternative embodiment, the user at endpoint 12 may not want to monitor the second call since the user placed the second call on hold. Control unit 56, therefore, may stop mixing the incoming media streams.

Figure 4:
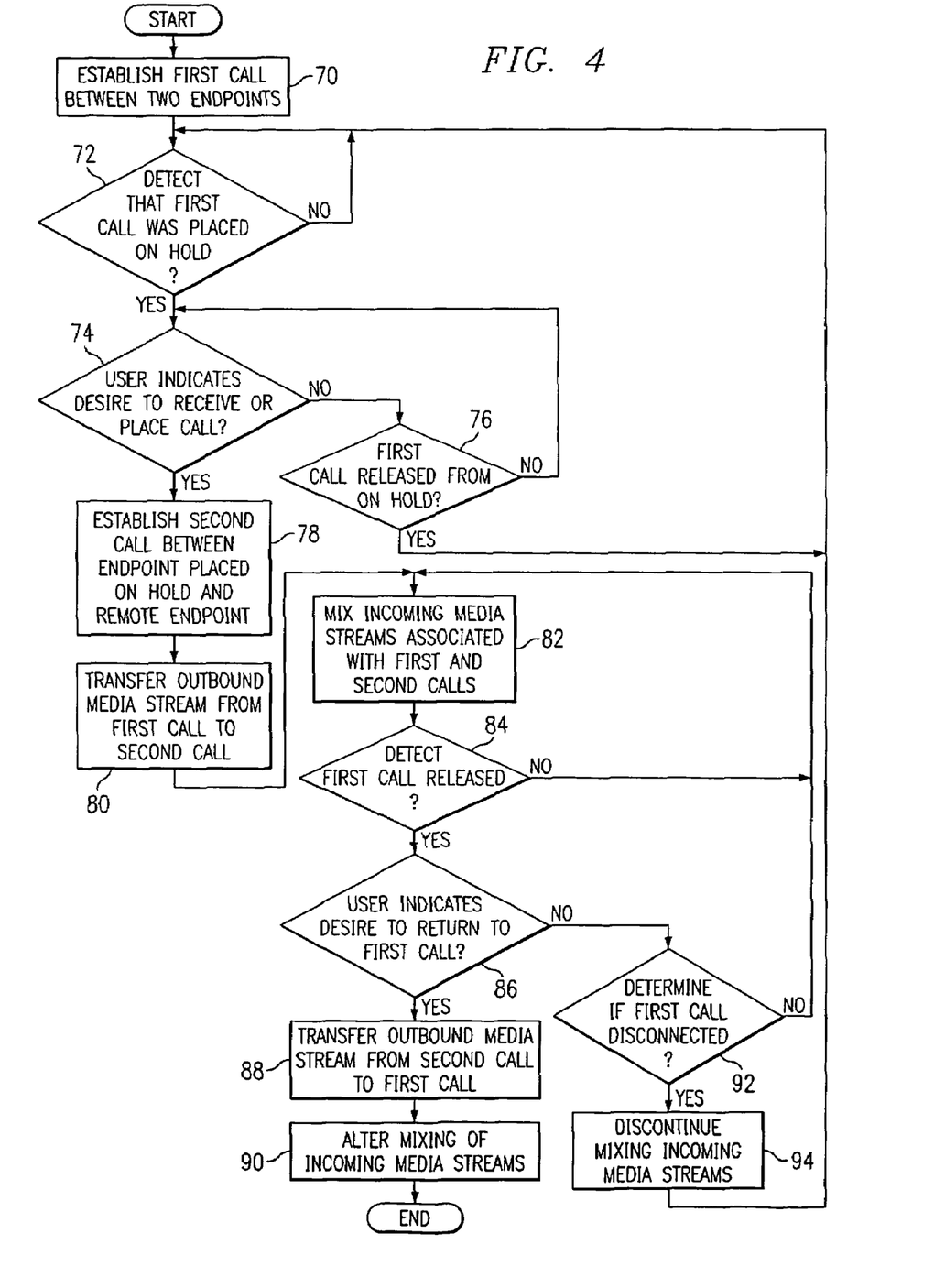
FIG. 4 illustrates a flow chart of a method for managing incoming and outgoing calls at an endpoint placed on hold.

FIG. 4 illustrates a flowchart of a method for stop mixing the incoming media streams. managing incoming and outgoing calls at an endpoint placed on hold. Generally, a call may be established between two or more of endpoints 12 using network 22. If a user at endpoint 12 places the call on hold, a user at endpoint 14 may want to place or receive another call without disconnecting from the on-hold call. After establishing a second call, the user at endpoint 14 initiates a mixing function that generates a mixed media stream by mixing the incoming media streams from the on-hold and active calls. The mixed media stream allows the user to hear a speaker at the opposite end of the active call and monitor the on-hold call to determine when it is released from on hold.

At step 70, a first call is established between two endpoints 12 (e.g., endpoints 12 and 14) coupled to network 22. In one embodiment, call manager 18 provides signaling to endpoints 12 and 14 in order to establish the first call. At step 72, endpoint 12 determines if the first call has been remotely placed on hold by endpoint 14. In one embodiment, detection may occur when a user at endpoint 14 informs a user at endpoint 12 that the first call is being placed on hold. In alternative embodiments, endpoint 12 may receive notification that the first call is being placed on hold in a media packet communicated from endpoint 14, or call manager 18 may detect that the first call was remotely placed on hold and notify endpoint 12. As described above in reference to FIG. 3, the notification message from endpoint 14 or call manager 18 may be displayed through status 44 on display 32. If the first call has not been placed on hold, endpoint 12 continues to monitor the first call at step 72

If endpoint 12 receives notification that the first call has been placed on hold, control unit 56 determines if the user at endpoint 12 has indicated a desire to place or receive a call on another line at step 74. In one embodiment, the user may indicate a desire to establish a second call by pressing a flash button, mix button 36 or any other suitable button on endpoint 12 that selects a line associated with endpoint 12 that is available to conduct the second call. If the user does not indicate a desire to place or receive a second call, control unit 56 determines if the first call was released from on hold at step 76. If the first call was released from on hold, control unit 56 monitors the first call at step 72 to determine if the first call has been placed back on hold. If the first call is on hold, control unit 56 waits for an indication that the user would like to place or receive another call at step 74.

If the user does indicate a desire to place or receive a second call, control unit 56 requests call manager 18 to establish a communication link between endpoints 12 and 16 at step 78. Call manager 18 provides signaling to endpoints 12 and 16 and directs the media streams from endpoints 12 and 16 to the addresses associated with each endpoint. While call manager 18 is setting up the second call, control unit 56 also instructs transmit unit 52 to communicate an outbound media stream to endpoint 16 at step 80.

In one embodiment, control unit 56 receives a signal indicating that the outbound media stream should be communicated in the second call when a user at endpoint 12 presses mix button 36. In an alternative embodiment, call manager 18 generates a signal that instructs transmit unit 52 to communicate the outbound media stream to endpoint 16. The signal provided by call manager 18 may include the IP address or any other suitable identifier associated with endpoint 16. Transmit unit 52 may communicate the outbound media stream to endpoint 16 in the second call by transferring the outbound media stream to the second call. If transmit unit 52 transfers the outbound media stream to the second call, the outbound media stream is removed from the first call.

Once a second call has been established between endpoints 12 and 16, control unit 56 mixes a first incoming media stream associated with the first call and a second incoming media stream associated with the second call at step 82. In one embodiment, the user at endpoint 12 presses mix button 36, which communicates a signal to control unit 56 indicating that the mixing function should be initiated. In alternative embodiments, a signal received from endpoint 12 indicates that the first call was remotely placed on hold and may be used by control unit 56 to begin mixing incoming media streams associated with the on-hold call and the active call. In another embodiment, endpoint 12 may not have the capability to mix incoming media streams. In this example, call manager 18 may initiate the mixing function on call resource 20 after call manager 18 detects that the first call was placed on hold and the second call was established. Call manager 18 may then direct the incoming media streams from endpoints 14 and 16 to call resource 20. Call resource 20 may process the incoming media streams to generate a mixed media stream. Call manager 18 may then instruct call resource 20 to communicate the mixed media stream to endpoint 12.

The mixed media stream generated by control unit 56 or call resource 20 contains a reduced percentage of the power associated with the media stream from the on-hold call and a maximum percentage of the power associated with the media stream from the active call. The percentage of each media stream corresponds to the volume of the voice information presented to the user at endpoint 12 from each incoming media stream through speaker 60. In one embodiment, the mixed media stream may include approximately one hundred percent of the active call, e.g., the second call, and approximately ten to forty percent of the call on hold, e.g., the first call. In alternative embodiments, the mixed media stream may include any suitable percentage for the first and incoming media stream such that the percentage the on-hold call is less than fifty percent.

In one embodiment, endpoint 12 may generate a signal instructing endpoint 14 not to play music or other messages while the first call is on hold. The signal may be communicated to endpoint 14 prior to transferring the outbound media stream or it may be communicated to call manager 18 as part of the signaling protocol used to establish the second call. In an alternative embodiment, call manager 18 may generate the signal after detecting that a second call has been established betwen endpoints 12 and 16.

At step 84, endpoint 12 and/or call manager 18 monitors the first call to determine if it has been released from on hold by endpoint 14. The first call may be monitored by the user at endpoint 12, control unit 56, call manager 18, or any other suitable device associated with the first call. In one embodiment, the user at endpoint 12 detects that the first call has been released when the user at endpoint 14 verbally indicates that the first call has been removed from on hold. In alternative embodiments, endpoint 12 directly detects that the first call has been removed from on hold by receiving a media packet containing the notification from endpoint 14 or receiving a signal from call manager 18 that indicates that the first call has been removed from on hold. The direct notification may be displayed through status 44 on display 32.

If the first call remains on hold, the mixing function continues to mix the first and second incoming media streams at step 82 and the first call continues to be monitored at step 84. If endpoint 14 releases the first call from on hold, control unit 56 determines if the user has indicated a desire to return to the first call at step 86. If control unit 56 detects that the user at endpoint 12 desires to return to the first call, control unit 56 instructs transmit unit 52 to communicate the outbound media stream to endpoint 14 in the first call at step 88. In one embodiment, the user at endpoint 12 presses mix button 36 to return to the first call. Pressing mix button 36 may simultaneously place the second call on hold and generate a signal that instructs transmit unit 52 to communicate the outbound media stream in the first call. In an alternative embodiment, pressing mix button 36 places the second call on hold and signals to call manager 18 that the second call has been placed on hold. Call manager 18 then generates a signal instructing transmit unit 52 to communicate the outbound media stream in the first call.

At step 90, the mixing of the incoming media streams may be altered after detecting that the first call was released by endpoint 14. In one embodiment, control unit 56 or call resource 20 may discontinue mixing the incoming media streams since endpoint 12 controls the second call and may not need to monitor both calls. In an alternative embodiment, the user at endpoint 12 may want to monitor the second call to determine if the user at endpoint 16 wants to disconnect the call. In this example, control unit 56 or, alternatively, call resource 20 after receiving an instruction from call manager 18, toggles the percentages of the first and second incoming media streams in the mixed media stream. For example, since the first call is active, the percentage of the first incoming media stream may be greater than the percentage of the second incoming media stream.

If the user does not indicate a desire to return to the first call, control unit 56 determines if the first call has been disconnected at step 92. If the first call has not been disconnected, control unit 56 continues to mix the first and second incoming media streams at step 82 and monitor the first call to determine if the first call was released from on hold at step 84. If the first call has been disconnected, control unit 56 stops mixing the incoming media streams associated with the first and second calls at step 94 since the first call has been disconnected. In an alternative embodiment, call manager 18 may instruct call resource 20 to stop mixing the incoming media streams. Control unit 56 may then monitor the active call (e.g., the second call) to determine if endpoint 16 has placed the second call on hold at step 72.

Although the present invention has been described with several embodiments, a myriad of changes, variations, alterations, transformations, and modifications may be suggested to one skilled in the art, and it is intended that the present invention encompass such changes, variations, alterations, transformations, and modification as fall within the scope of the appended claims.

What is claimed is:

1. A method, comprising:
   receiving, using a packet switched network, first and second incoming packet media streams associated with respective first and second communication sessions, at an IP telephone;
   wherein the first communication session comprises a communication session between the IP telephone and a first endpoint;
   detecting that the first communication session was placed on hold by the first endpoint; and
   mixing the first and second incoming packet media streams at the IP telephone, for presentation to a user of the IP telephone.

2. The method of claim 1, further comprising presenting the mixed first and second incoming packet media streams to a user of the IP telephone.

3. The method of claim 1,
   wherein the second communication session is established with a second endpoint after detecting that the first communication session was placed on hold.

4. The method of claim 1, further comprising communicating an outbound packet media stream in the second communication session.

5. The method of claim 2, wherein presenting the mixed first and second incoming packet media streams to the user of the IP telephone comprises generating a mixed packet media stream that includes a first percentage of volume of the first incoming packet media stream and a second percentage of volume of the second incoming packet media stream.

6. The method of claim 4, wherein the outbound packet media stream comprises a second outbound packet media stream, and further comprising:
   communicating a first outbound packet media stream to the first endpoint;
   detecting that the first endpoint placed the first communication session on hold; and
   discontinuing the first outbound packet media stream after detecting that the first endpoint placed the first communication session on hold.

7. The method of claim 6, further comprising:
   detecting that the first communication session has been removed from hold by the first endpoint; and
   communicating the outbound packet media stream in the first call after detecting that the first call was removed from hold.

8. An IP telephone, comprising:
   a network interface operable to couple to a packet switched network;
   a transmit circuit coupled to the network interface;
   a receive circuit coupled to the network interface; and
   a control circuit coupled to the receive circuit, the control circuit being operable to:
   receive first and second incoming packet media streams associated with respective first and second communication sessions;
   detect that the first communication session was placed on hold; and
   mix the first and second incoming packet media streams, for presentation to a user of the IP telephone.

9. The IP telephone of claim 8, wherein the transmit circuit is operable to transmit a first outgoing packet media stream associated with the first communication session.

10. The IP telephone of claim 8, wherein:
    the transmit circuit is operable to transmit a first outgoing packet media stream associated with the first communication session; and
    the control circuit is operable to discontinue the first outgoing packet media stream in response to detecting that the first communication session was placed on hold.

11. The IP telephone of claim 9, further comprising:
    a user interface being operable to detect that a user has activated a mute function; and
    the control circuit being operable to discontinue the first outgoing packet media stream in response to detecting that the user has activated the mute function.

12. The IP telephone of claim 8, further comprising:
    a user interface being operable to detect that a user has activated a volume control function; and
    the control circuit being operable to adjust volume of the first incoming packet media stream relative to volume of the second incoming packet media stream, in response to detecting the activation of the volume control function.

13. The IP telephone of claim 9, further comprising:
    a user interface operable to detect that a user of the IP telephone would like to initiate the second communication session; and
    wherein the control circuit is operable to transfer the first outbound packet media stream from the first communication session to the second communication session.

14. The IP telephone of claim 8, wherein the control circuit is further operable to generate a mixed packet media stream that includes a first percentage of the first incoming packet media stream and a second percentage of the second incoming packet media stream.

15. The IP telephone of claim 14, further comprising:
    a user interface that allows a user to adjust the first percentage relative to the second percentage; and
    wherein the control circuit adjusts that first percentage relative to the second percentage in response to information received at the user interface.

16. Logic recorded on tangible computer-readable media, the logic operable to perform the following steps:
    receive, using a packet switched network, first and second incoming packet media streams associated with respective first and second communication sessions, at an IP telephone wherein the first communication session comprises a communication session between the IP telephone and a first endpoint;

detect that the first communication session was placed on hold by the first endpoint; and mix the first and second incoming packet media streams at the IP telephone, for presentation to a user of the IP telephone.

17. The logic of claim 16, wherein the logic is further operable to establish the second communication session with a second endpoint after detecting that the first communication session was placed on hold.

18. The logic of claim 16, wherein the logic is further operable:

generate a mixed packet media stream that includes a first percentage of volume of the first incoming packet media stream and a second percentage of volume of the second incoming packet media stream; and present the mixed packet media stream to a user of the IP telephone.

19. A system, comprising:

means for receiving, using a packet switched network, first and second incoming packet media streams associated with respective first and second communication sessions, at an IP telephone wherein the first communication session comprises a communication session between the IP telephone and a first endpoint;

means for detecting that the first communication session was placed on hold by the first endpoint; and means for mixing the first and second incoming packet media streams at the IP telephone, for presentation to a user of the IP telephone.

20. The system of claim 19, further comprising means for establishing the second communication session with a second endpoint after detecting that the first communication session was placed on hold.

21. The system of claim 19, further comprising:

means for generating a mixed packet media stream that includes a first percentage of volume of the first incoming packet media stream and a second percentage of volume of the second incoming packet media stream; and means for presenting the mixed packet media stream to a user of the IP telephone.

* * * * *